United States Patent [19]

Klein

[11] Patent Number: 4,792,398
[45] Date of Patent: Dec. 20, 1988

[54] MANUAL VACUUM FILTRATION DEVICE

[75] Inventor: Vernon W. Klein, Kansas City, Mo.

[73] Assignee: Marion Laboratories, Inc., Kansas City, Mo.

[21] Appl. No.: 84,029

[22] Filed: Aug. 10, 1987

[51] Int. Cl.[4] .................................................. B01D 29/00
[52] U.S. Cl. ................................ 210/406; 210/416.1;
210/475; 210/479; 210/433.1
[58] Field of Search .................. 210/406, 416.1, 433.2,
210/475, 477, 479

[56] References Cited

U.S. PATENT DOCUMENTS

| | | | |
|---|---|---|---|
| 2,842,267 | 7/1958 | Shire et al. | 210/416.1 |
| 2,879,207 | 3/1959 | Poitras | 210/406 X |
| 2,896,787 | 7/1959 | Roman | 210/406 |
| 3,501,012 | 3/1970 | Ryan | 210/406 |
| 4,301,010 | 11/1981 | Eddleman et al. | 210/406 |

*Primary Examiner*—Charles Hart
*Attorney, Agent, or Firm*—Robert S. Beiser

[57] ABSTRACT

A manual liquid filtration device includes a housing having an open lower end providing access to an internal vacuum chamber, and defining a liquid specimen receiving chamber at its upper end adapted for flow communication with the vacuum chamber. An elastic diaphragm extends across the lower open end of the housing and upwardly along its outer peripheral surface so as to cooperate with air orifices in the housing to define valve means enabling unidirectional air flow from the vacuum chamber. A porous membrane filter element is interposed between the specimen receiving chamber and the vacuum chamber and when dry enables air to pass therethrough from the vacuum chamber upon flexing of the diaphragm into the vacuum chamber. When wetted by water, the filter element maintains vacuum in the vacuum chamber but enables liquid from a liquid specimen to be drawn through the filter element so as to retain solid particulate on the filter element for diagnosis or further reagent washing.

14 Claims, 1 Drawing Sheet

U.S. Patent　　Dec. 20, 1988　　4,792,398
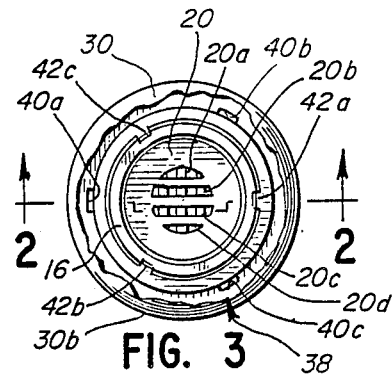
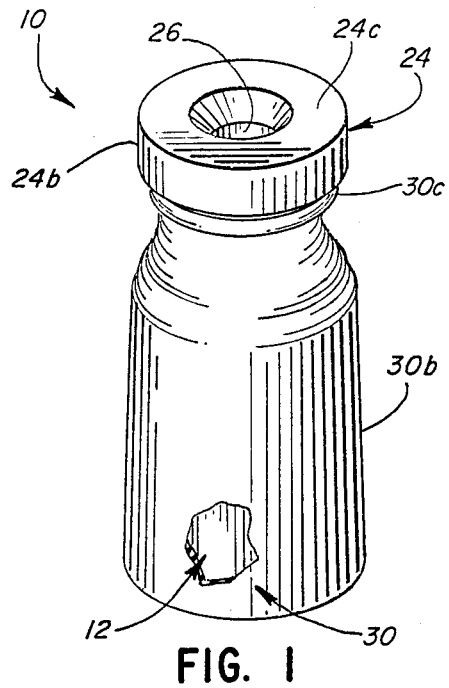
FIG. 1
FIG. 3
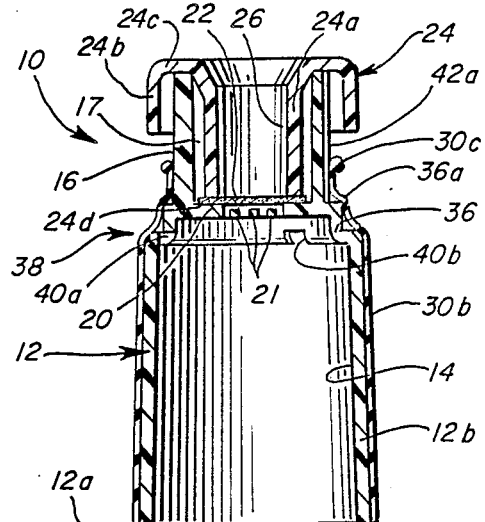
FIG. 3
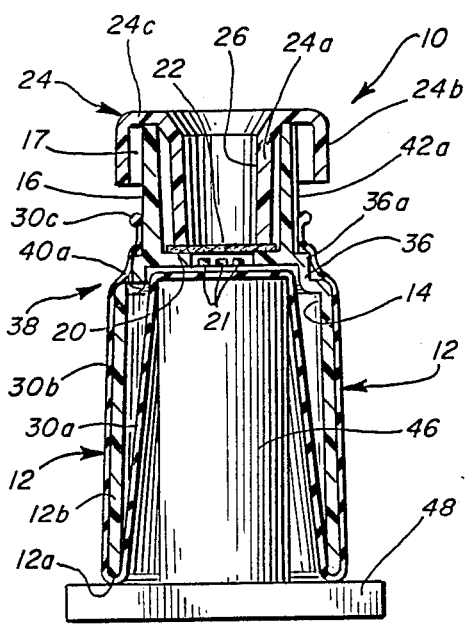
FIG. 4
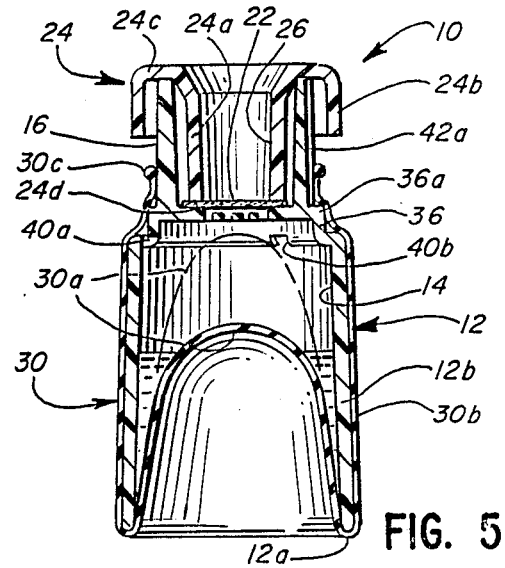
FIG. 5

MANUAL VACUUM FILTRATION DEVICE

BACKGROUND OF THE INVENTION

The present invention relates generally to vacuum filtration devices, and more particularly to a novel disposable manual vacuum filtration device for separating solid particulate from a liquid specimen and which finds particular application where a relatively modest degree of vacuum and evacuated volume are required for filtration.

It is a common practice in the testing and analysis of many types of solid materials to place a sample of the material into a liquid reagent after which the liquid reagent is filtered from the solid reactant leaving it available for diagnosis or further testing or washing with other reagents. Similarly, liquids such as various types of body fluids may have solid test reactants admixed therewith after which the solid reactants are extracted from the liquid by filtering to facilitate analysis of the reactants. Still further, liquids which in their natural state may have micro-organisms present are frequently analyzed by filtering the micro-organisms from a liquid sample for incubating and analysis.

One technique for filtering solid reactants or microorganisms from liquid reagents or carriers is to employ a vacuum filtration device having a filter element on which a liquid sample is placed in a manner enabling the liquid to be drawn through the filter by vacuum so that the solid constituents are retained on the filter element. See, for example, U.S. Pat. Nos. 2,005,406, 2,896,787, and 3,782,175 each of which employs a vacuum chamber adapted to support a filter element at its upper end and which is operative to filter a liquid sample through the filter element when the vacuum chamber is connected to a source of vacuum. Another device which utilized suction to draw the liquid portion of a specimen through a filter element and which facilitates both on-site filtering and incubation of microorganisms in liquid specimens is disclosed in U.S. Pat. No. 2,879,207.

The filtering devices exemplified by the aforementioned U.S. patents exhibit a number of drawbacks. For example, they require a separate vacuum source such as a vacuum pump or an evacuated bottle to effect vacuum filtering; they are relatively bulky and cumbersome to use; and they require rather complex manipulation to accomplish the desired vacuum filtration.

More recently, attempts have been made to provide apparatus for liquid filtering and sampling which are of relatively small size and are operable by manual manipulation to effect pressure differential filtering. See U.S. Pat. Nos. 3,832,141, 3,846,077, 3,955,423, and 4,644,807. These devices, while being adapted to separate stratified immiscible liquids, do not enable manual manipulation to effect vacuum filtration of liquid specimens so as to filter out solid reactants or particulate for diagnosis. Moreover, these devices require that relatively close tolerances be maintained in the manufacture of their various components, thus increasing their cost significantly.

SUMMARY OF THE INVENTION

A general object of the present invention to provide a novel manually operable disposable liquid filtration device which is economical to manufacture, simple to use and highly efficient in operation.

A more particular object of the present invention is to provide a novel vacuum filtration device which facilitates manual vacuum filtration of a liquid specimen without need for a separate vacuum pump or laboratory vacuum system.

A further object of the present invention is to provide a novel manually operable vacuum filtration device of relatively small size and which defines a liquid specimen receiving chamber having communication through a porous membrane filter with a vacuum chamber one end of which is defined by a gas impermeable elastic diaphragm adapted to be extended into the vacuum chamber so as to displace air therefrom and effect a vacuum sufficient to draw the liquid portion of the specimen through the filter element with any solid constituent or reactant being retained by the filter element.

A feature of the manual vacuum filtration device in accordance with the invention lies in the utilization of a poruos membrane filter element which allows air passage outwardly therethrough when the elastic diaphragm is extended into the vacuum chamber and which may be wetted by water or the like to prevent air passage into the vacuum chamber after release of the elastic diaphragm, thus creating a vacuum within the vacuum chamber sufficient to draw liquid from a liquid specimen through the filter element so that any solid constituents are retained on the filter element for diagnosis or application of a further liquid reagent.

Another feature of the vacuum filtration device in accordance with the invention lies in the provision of unidirectional valve means operative to facilitate release of air from the vacuum chamber upon inward extension of the elastic diaphragm to thereby facilitate release of air from the vacuum chamber while a liquid specimen is disposed on the filter element.

Further objects and advantages of the invention, together with the organization and manner of operation thereof, will become apparent from the following detailed description of the invention when taken in conjunction with the accompanying drawing wherein like reference numerals designate like elements throughout the several views.

BRIEF DESCRIPTION OF THE DRAWINGS

FIG. 1 is a perspective view of a vacuum filtration device constructed in accordance with the present invention;

FIG. 2 is a longitudinal sectional view taken substantially along line 2—2 of FIG. 3;

FIG. 3 is a plan view of the filtration device of FIG. 1 but with the upper filter retaining cap removed for purposes of illustration;

FIG. 4 is a longitudinal sectional view similar to FIG. 2 but illustrating the filtration device placed over a tool operative to extend the flexible diaphragm into the vacuum chamber so as to displace air therefrom; and FIG. 5 is a longitudinal sectional view illustrating operation of the filtration device after establishing a vacuum within the vacuum chamber.

DETAILED DESCRIPTION

Referring to the drawings, a manual vacuum filtration device constructed in accordance with the present invention is indicated generally at 10. The vacuum filtration device 10, which may alternatively be termed a vacuum accumulator, is a relatively inexpensive, disposable manually operable filtration device which may be readily hand manipulated to effect vacuum filtration of small quantities of liquids without need for a separate vacuum pump or laboratory vacuum system. The vacuum filtration device finds particular application where a modest degree of vacuum and relatively small evacuated volume are required to carry out the desired filtration procedure.

Turning now to FIG. 2, very generally, the vacuum filtration device 10 includes a housing, indicated generally at 12, which defines an internal generally cylindrical vacuum chamber 14 open at a lower end 12a of the housing. The housing 12 has an annular neck or wall 16 at its upper end which defines a filter receiving chamber 17 the lower end of which is established by a filter support platform 20 formed as an integral part of the housing. The filter support platform 20 serves to support a porous membrane filter element 22 which is maintained in fixed relation on the filter support platform by a filter retaining cap 24 mounted on the upper neck 16. The retaining cap 24 defines an internal liquid specimen receiving chamber 26 immediately overlying the filter element.

The open lower end 12a of the housing 12 is closed by elastic means in the form of an elastic gas impermeable diaphragm 30 which in its relaxed state is of a closed end tubular configuration and is mounted on the housing so as to extend across the open end of the housing, as indicated at 30a, and longitudinally upwardly along the outer generally cylindrical surface of the housing in a generally tubular wall portion 30b. The diaphragm 30 is made of an elastic material, such as thin sheet latex rubber, of sufficient elasticity to enable the lower portion 30a to be flexed upwardly into the vacuum chamber 14 so as to displace air therefrom and effect a vacuum within chamber 14 upon release of the diaphragm. As will be described, in the illustrated embodiment the diaphragm 30 cooperates with the housing 12 to define unidirectional valve means which enables outward passage of air displaced from the chamber 14 when the diaphragm is flexed upwardly therein, but prevents inward passage of air into the vacuum chamber when the diaphragm is released.

Turning now to a more detailed description of the vacuum filtration device 10, the housing 12 is preferably made of a suitable strength plastic material having a lower generally annular wall 12b which defines the outer periphery of the vacuum chamber 14 and is formed integral with the filter platform 20 and annular neck 16 through an annular stepped wall 36. The wall 12b may be substantially cylindrical or tapered slightly outwardly toward the lower end 12a in a generally frusto-conical configuration.

The filter support platform 20 is integrally connected at its outer peripheral edge to the base of the annular neck 16 and has a plurality of openings 20a–d formed therethrough which establish a filter support grid and provide communication between the specimen receiving chamber and the vacuum chamber 14. The openings 20a–d are formed as generally elongated parallel spaced openings which, in plan view, may be circumscribed by a circle. Each opening 20a–d has a plurality of transverse bridging elements, such as indicated at 21 in FIG. 2, which add structural integrity to the filter support grid.

The porous membrane filter element 22 is of circular configuration to enable placement over substantially the full upwardly facing surface of the support grid 20 within the housing neck 16. The filter element may comprise a micropore filter, such as manufactured by Milipore Corporation, having hydrophilic properties. Generally, the pore size may be selected from a range of from 0.25 to 12 microns depending on the material being filtered. The filter element 22 is characterized by its ability when dry to allow air or other gas to pass therethrough, such as when air is displaced from chamber 14 during upward flexing of the elastic diaphragm into the vacuum chamber, but which when wetted by a drop of water or other liquid prevents air passing through the filter element. The latter characteristic is due to capillary forces retaining liquid in the pores of the filter membranes so as to effectively seal the micropore openings and prevent air flow therethrough. In this manner, a vacuum condition is created in the chamber 14 upon release of the elastic diaphragm after upward flexing to displace air from the vacuum chamber. The filter element is further characterized as enabling the liquid portion of a liquid specimen placed on the filter element to be pulled through the filter membranes by a relatively small magnitude vacuum created within the vacuum chamber. When the liquid from a liquid specimen has been drawn through the filter element, the filter is again sealed by capillary forces acting between the wetted filter membranes to again maintain a vacuum, although reduced, in the vacuum chamber.

The filter element preferably comprises a 5 micron glass fiber filter supported on a non-woven fabric, such as available from Micro Filtration Systems, Inc. The filter membrane is coated with a material which can bind an analyte of interest to allow separation of non-particulate analytes from the bulk fluid. For instance, the captured material might be an antibody, an antigen, a receptor protein, a lectin, or other such material which can specifically or non-specifically separate some or all of the analyte from the sample solution and non-analyte materials contained therein.

The filter element 22 is retained on the filter support platform 20 by the filter retaining cap 24. The filter retaining cap is preferably made of a white plasatic and has a tubular wall 24a which defines the specimen receiving chamber 26 and is formed integral at its upper end with an annular skirt 24b through an upper generally planar wall 24c. The filter retaining cap 24 is sized so that when placed within the annular neck 16 of the housing 12, the upper wall 24 seats on the upper annular end of neck 16 and a lower annular edge surface 24d seats against the filter element 22 so as to compress the filter element against the filter support platfrom 20 circumferentially about the openings 20a–d sufficiently to prevent liquid from passing radially beneath the lower edge of the filter retaining cap. The filter retaining cap is preferably fixed to housing 12 as by ultrasonic welding between the upper end of the neck 16 and the wall 24c of the filter retaining cap.

As aforementioned, one feature of the vacuum filtration device 10 lies in the provision of a unidirectional valve mechanism, generally designated as 28, operative to enable air within the vacuum chamber 14 to be displaced outwardly therefrom upon upward flexing of the elastic diaphragm 30a, but which prevents reverse air flow into the vacuum chamber upon release of the diaphragm. To this end, the diaphragm 30 and housing 12 are cooperable to define unidirectional valve mechanism 38 operative to enable release of air from the vacuum chamber upon upward extension or flexing of the diaphragm into the vacuum chamber but which prevents air flow in a reverse direction. The unidirectional valve mechanism 38 includes a plurality of air passages or orifices formed in equidistantly circumferentially spaced relation about the annular stepped wall 36, there being three such air orifices in the illustrated embodiment as indicated at 40a-c, best shown in FIG. 3. The air orifices 40a-c are formed so as to intersect the external surface of the stepped wall 36 between an outer annular edge surface 12c at the upper end of the housing wall 12b and an annular sealing edge surface 36a formed circumferentially of the annular wall 36 parallel to and spaced upwardly from edge surface 12c, best shown in FIG. 2. The annular wall 30b of the elastic diaphragm is formed to extend upwardly over the annular wall 36 and along the neck 16, with the elastic properties of the diaphrgm causing it to normally engage the annular edge surfaces 12c and 36a in airtight sealed relation therewith. The upper open end of the diaphragm is preferably formed with an integral elastic annular rim or band 30c which maintains a relatively tight engagement with the outer surface of neck 16.

A plurality of air vent grooves or slots are formed longitudinally along the outer surface of the neck 16, there being three such grooves 42a-c in the illustrated embodiment formed to extend upwardly from the base of the neck and lie generally intermediate the air orifices 40a-c as shown in FIG. 3. The air vent grooves 48a-c are of sufficient radial depth that air flow through the vent grooves is not inhibited by the annular rim 30c of diaphragm 30. In this manner, the diaphragm wall 30b cooperates with the annular sealing surface 36a to normally prevent air flow through the orifices 40a-c. When the diaphragm wall 30a is flexed upwardly into the vacuum chamber 14, the increased air pressure is sufficient to force air unidirectionally outwardly through the orifices 40a-c and upwardly between the diaphragm and sealing edge 36a into the vent grooves 42a-c to atmosphere. It will be appreciated that the number and flow sizes of the air orifices formed through the annular wall 36, as well as the number of air vent grooves formed along the neck 16, may be selectively varied to provide the desired rate of air discharge from the vacuum chamber during operation.

Referring to FIGS. 4 and 5, operation of the vacuum filtration device 10 may be initiated by placing the housing 12 over an upstanding tool, such as a generally cylindrical mandrel 46, having a diameter slightly less than the internal diameter of the stepped housing wall 36. The mandrel 46 is of a longitudinal length such that downward movement of the housing 12 coaxially over the mandrel flexes the elastic diaphragm upwardly within the vacuum chamber 14 to displace substantially all of the air from the vacuum chamber. Preferably, the mandrel is of sufficient longitudinal length to extend substantially to the lower surface of the filter support platform 20 when the lower edge 12a of the housing engages a base 48 on which the mandrel is mounted. In one mode of operation, placement of the filtration device over the mandrel 46 may be undertaken prior to wetting of the filter element 22 with water and prior to placement or deposit of a liquid specimen onto the filter element. Extension or flexing of the elastic diaphragm into the vacuum chamber causes air to pass upwardly through the dry filter element and also outwardly through the air orifices 40a-c forcing the diaphragm to release from the sealing edge 36a and allow the escaping air to pass upwardly through the vent grooves 42a-c. In this manner, virtually all of the air from the vacuum chamber is exhaustd or displaced.

With the filtration device mounted on the mandrel 46 as illustrated in FIG. 4, a drop of water or other liquid is placed on the filter element 22 so as to effect wetting thereof as aforedescribed. Thereafter, removal of the filtration device from the mandrel causes the diaphragm to reseal against the sealing edge 36a and the transverse wall portion 30a to attempt to restore itself to its nonflexed position. The wetted filter element prevents passage of air inwardly into the vacuum chamber so that the diaphragm remains in an upwardly flexed position, as illlustrated in phantom at 30'a in FIG. 5, creating a vacuum within the vacuum chamber 14 above the diaphragm. The filtration device is now prepared for a filtration procedure.

After creating a vacuum within the vacuum chamber 14 as thus described, a liquid specimen is placed on the filter element 22 within the specimen receiving chamber 26. The liquid portion of the specimen is drawn through the filter element by vacuum within the vacuum chamber. After all of the liquid from the liquid specimen has been drawn through the filter element, the filter element is again sealed by the capillary forces of the retained liquid in the pores of the wetted filter membrane. This action maintains a somewhat reduced vacuum within the vacuum chamber 14 to enable additional filtration or washing of solid constituents from the liquid specimen retained on the filter element.

Because the dry filter membranes of the small pore filter element normally present considerable resistance to air passage through the filter element, the unidirectional valve means, as defined by the air orifices 40a-c and the elastic diaphragm acting on the housing edge surface 36a, facilitates more rapid discharge or release of air from the vacuum chamber 14 upon upward flexing of the diaphragm 30a to more readily create a vacuum therein. Another advantage of the unidirectional valve means is that it permits a liquid specimen to be placed on the filter element 22 prior to creation of vacuum within the chamber 14. Since the liquid specimen will substantially prevent outward passage of air through the filter element due to the capillary forces acting within the filter element, the unidirectional valve means facilitates displacement of air from the vacuum chamber to create a vacuum therein. If desired, further valve means (not shown) may be provided to enable selective air flow into the chamber 14 so as to destroy any vacuum therein at any time during a filtering procedure.

Thus, in accordance with the present invention, a self-contained manually operable vacuum filtration device is provided which is relatively simple in construction and operation and thereby economical to manufacture, thus lending itself to disposal after completion of filtration procedure.

While a preferred embodiment of the present invention has been illustrated and described, it will be understood that changes and modifications may be made therein without departing from the invention in its broader aspects. Various features of the invention are defined in the following claims.

What is claimed is:

1. A liquid filtration device comprising, in combination, a housing having upper and lower ends and defining an internal chamber opening outwardly of said housing, said housing further defining a liquid specimen receiving chamber at its upper end adapted for flow communication with said internal chamber, a filter element interposed between and exposed to said specimen receiving chamber and said internal chamber, said filter element being charcterized as substantially impervious to air flow therethrough when wetted by liquid but enabling flow of specimen liquid therethrough when subjected to vacuum within said internal chamber, and elastic means mounted on said housing so as to traverse said outward opening of said internal chamber, said elastic means enabling flexing into said internal chamber so as to displace air from said internal chamber and create a vacuum therein upon wetting of said filter element and release of said elastic means.

2. A liquid filtration device as defined in claim 1 wherein said elastic means comprises an elastic diaphragm mounted on said housing so as to extend across said outwad opening of said internal chamber.

3. A liquid filtration device as defined in claim 2 wherein said housing has a generally annular wall defining the periphery of said internal chamber and open at a lower end to establish said outward opening of said chamber, said elastic diaphragm being mounted on said housing so as to extend across said open lower end of said annular wall and upwardly along the outer peripheral surface of said annular wall.

4. A liquid filtration device as defined in claim 1 including unidirectional valve means enabling unidirectional air flow therethrough from said internal chamber when said elastic means is flexed to extend into said internal chamber.

5. A liquid filtration device as defined in claim 3 wherein said housing has at least one air orifice therethrough communicating with said internal chamber, said elastic diaphragm cooperating with said housing so as to define unidirectional valve means enabling unidirectional flow of air from said internal chamber outwardly through said air orifice upon flexing of said diaphragm into said internal chamber.

6. A liquid filtration device as defined in claim 5 wherein said housing includes an annular sealing surface cooperative with said elastic diaphragm to define said unidirectional valve means.

7. A liquid filtration device as defined in claim 6 wherein said housing includes an upper annular neck having at least one air vent groove formed in its outer peripheral surface, said diaphragm being configured to encircle said neck such that air flow from said internal chamber is exhausted to atmosphere through said vent groove.

8. A liquid filtration device as defined in claim 1 wherein said housing further defines a filter support platform intermediate said internal chamber and said specimen receiving chamber, said filter support platform being operative to support said filter element thereon and having openings therethrough providing flow communication between said specimen receiving chamber and said internal chamber.

9. A liquid filtration device as defined in claim 8 including a retaining cap mounted on said upper end of said housing and being operative to retain said filter element against said filter support platform.

10. A liquid filtration device as defined in claim 9 wherein said filter element comprises a porous membrane filter, said retaining cap being further operative to compress said filter element against said filter support platform peripherally of said openings therethrough.

11. A system for effecting vacuum filtration of a liquid specimen comprising; a liquid filtration device including a housing having upper and lower ends and defining an internal chamber opening outwardly of said housing, said housing further defining a liquid specimen receiving chamber at its upper end adapted for flow communication with said internal chamber, a filter element interposed between and exposed to said specimen receiving chamber and said internal chamber, said filter element being characterized as substantially impervious to air flow therethrough when wetted by liquid but enabling flow of specimen liquid therethrough when subjected to vacuum within said internal chamber, elastic means mounted on said housing so as to traverse said outward opening of said internal chamber, said elastic means enabling flexing into said internal chamber so as to displace air from said internal chamber and create a vacuum therein upon wetting of said filter element and release of said elastic means, and tool means cooperative with said housing and elastic means to enable said flexing of said elastic means into said internal chamber.

12. A system as defined in claim 11 wherein said housing has a generally annular wall defining the periphery of said internal chamber and having an open lower end communicating with said internal chamber, said elastic means comprising an elastic diaphragm mounted on said housing so as to extend across said open lower end thereof, said housing and tool means being cooperative to enable insertion of said tool means into said open lower end so as to flex said diaphragm into said internal chamber and displace air therefrom.

13. A system as defined in claim 12 wherein said filtration device includes unidirectional valve means operative to enable unidirectional air passage from said internal chamber through said valve means.

14. A system as defined in claim 12 wherein said tool means comprises an upstanding generally cylindrical mandrel, said housing being manuallly manipulatable to enable downward movement over said mandrel so as to effect flexing of said diaphragm into said internal chamber to displace air therefrom.

* * * * *